US006590763B2

(12) United States Patent
Kishimoto

(10) Patent No.: US 6,590,763 B2
(45) Date of Patent: Jul. 8, 2003

(54) WEATHERPROOF SWITCH ASSEMBLY

(75) Inventor: Hitoshi Kishimoto, Osaka (JP)

(73) Assignee: Shimano Inc., Osaka (JP)

( * ) Notice: Subject to any disclaimer, the term of this patent is extended or adjusted under 35 U.S.C. 154(b) by 68 days.

(21) Appl. No.: 09/783,378

(22) Filed: Feb. 13, 2001

(65) Prior Publication Data

US 2002/0109964 A1 Aug. 15, 2002

(51) Int. Cl.[7] .............................. H05K 5/00; H01H 9/00
(52) U.S. Cl. ...................... 361/683; 361/728; 361/837; 335/205
(58) Field of Search .............................. 361/683, 819, 361/836, 837, 681, 679, 728, 752, 753; 335/6, 205, 229; 200/52

(56) References Cited

U.S. PATENT DOCUMENTS

| 3,569,645 | A | * | 3/1971 | Lea | ........................... 20/61.62 |
| 3,983,362 | A | * | 9/1976 | Hoogesteger et al. | ... 126/275 E |
| 4,296,394 | A | * | 10/1981 | Ragheb | ....................... 200/404 |
| 4,303,139 | A | * | 12/1981 | Hino et al. | ............. 177/210 FP |
| 4,609,910 | A | * | 9/1986 | Geringer et al. | .......... 200/61.62 |
| 5,673,314 | A | * | 9/1997 | Olkoski et al. | ......... 379/433.02 |
| 5,975,713 | A | * | 11/1999 | Brothers | ...................... 362/154 |
| 6,112,714 | A | * | 9/2000 | Brister | ................... 123/198 D |

FOREIGN PATENT DOCUMENTS

JP     S55-9312     1/1980

* cited by examiner

Primary Examiner—Jayprakash N. Gandhi
(74) Attorney, Agent, or Firm—Jeffer, Mangels, Butler & Marmaro LLP

(57) ABSTRACT

An assembly is provided. The assembly includes a casing having a magnet sensitive switch enclosed therein, and a magnet movably associated with the outside of the casing. The magnet is capable of movement relative to the casing. The magnet can be disposed in at least two positions. The at least two positions include a first position where the magnetic field generated by the magnet does not affect the switch, and a second position wherein the magnetic field generated by the magnet does affect the switch.

10 Claims, 4 Drawing Sheets

WEATHERPROOF SWITCH ASSEMBLY

FIELD OF THE INVENTION

The present invention relates to a weatherproof switch assembly and more particularly a weather proof cycle computer switch assembly.

BACKGROUND OF THE INVENTION

As shown in FIG. 1, cycle computers are often mounted on the handlebars of a bicycle or other cycle. The present invention is described herein as used with a bicycle. It will be understood that this is not a limitation on the present invention. The weatherproof casing and switch assembly described herein can be used in any situation where a weatherproof casing that includes a switch is desired.

When in use, bicycles, and therefore, cycle computers often encounter adverse weather conditions, such as rain or snow. The casing surrounding the computer must be weatherproof to prevent moisture from getting to the components of the computer, including the switch. In the prior art, the switch protrudes from the casing of the cycle computer and its sealed with rubber or other elastomeric material. However, the seal can easily be compromised, which typically results in moisture getting inside the casing and short circuiting the switch or other components therein.

A long felt need exists for a computer casing and switch that are substantially weatherproof and prevent moisture from getting into the cycle computer casing.

SUMMARY OF THE PREFERRED EMBODIMENTS

In accordance with one preferred embodiment of the present invention there is provided an assembly including a casing having a magnet sensitive switch enclosed therein, and a magnet movably associated with the outside of the casing. The magnet is capable of movement relative to the casing. The magnet can be disposed in at least two positions. The at least two positions include a first position where the magnetic field generated by the magnet does not affect the switch, and a second position wherein the magnetic field generated by the magnet does affect the switch. In a preferred embodiment, the assembly includes a flip hingedly secured to the outside of the casing and the magnet is secured to the flip. The flip can be secured to the casing by a hinge pin or the casing and the flip can be formed as a single unit, such that the flip is connected to the casing by a piece of resilient material. In another preferred embodiment, the magnet is secured to a button movably coupled to an outside of the casing.

In accordance with another aspect of the present invention there is provided a cycle computer including a casing having a screen and a magnet sensitive switch enclosed therein, an electric circuit disposed inside the casing, and a magnet movably associated with said casing, such that the magnet is capable of movement relative to said casing. The circuit includes the switch and a processor electrically connected to the switch and the screen. The magnet can be disposed in at least two positions including a first position where the magnetic field generated by the magnet does not affect the switch and a second position where the magnetic field generated by the magnet does affect the switch.

In accordance with yet another aspect of the present invention there is provided a cycle computer including a casing having a front wall, a back wall, and a plurality of side walls that cooperate to surround a casing interior and a pair of opposed members extending outwardly from a first side wall, an electric circuit disposed inside the casing, a flip hingedly secured to the opposed members by a hinge pin, a spring disposed on the hinge pin and biasing the flip in a predetermined position, and a magnet secured to the flip. The front wall includes a screen and the circuit includes a magnet sensitive switch secured to the first side wall of the casing, and a processor electrically connected to the switch and the screen. The flip positions the magnet in at least two positions including a first position where the magnetic field generated by the magnet does not affect the switch, and a second position where the magnetic field generated by the magnet does affect the switch.

In accordance with yet another aspect of the present invention there is provided a cycle computer including a casing having a front wall, a back wall, and a plurality of side walls that cooperate to surround a casing interior and a button housing extending outwardly from a first side wall, an electric circuit disposed inside the casing, a button movably coupled to the button housing, a spring disposed in the button housing and biasing the button outwardly, and a magnet secured to the button. The front wall includes a screen and the circuit includes a magnet sensitive switch secured to the first side wall of the casing, and a processor electrically connected to the switch and the screen. The button positions the magnet in at least two positions including a first position where the magnetic field generated by the magnet does not affect the switch, and a second position where the magnetic field generated by the magnet does affect the switch.

In accordance with yet another aspect of the present invention there is provided a cycle computer including a casing having a front wall, a back wall, and a plurality of side walls that cooperate to surround a casing interior, an electric circuit disposed inside the casing, a flip hingedly secured to the casing by a piece of resilient material that biases the flip in a predetermined position, and a magnet secured to the flip. The front wall includes a screen and the circuit includes a magnet sensitive switch secured to the first side wall of the casing, and a processor electrically connected to the switch and the screen. The flip positions the magnet in at least two positions including a first position where the magnetic field generated by the magnet does not affect the switch, and a second position where the magnetic field generated by the magnet does affect the switch.

In accordance with yet another aspect of the present invention there is provided a method of turning on a cycle computer. The method includes the steps of providing a magnet sensitive switch, providing a magnet a predetermined distance from the switch, moving the magnet closer to said switch to change the state of the switch and energizing the cycle computer.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
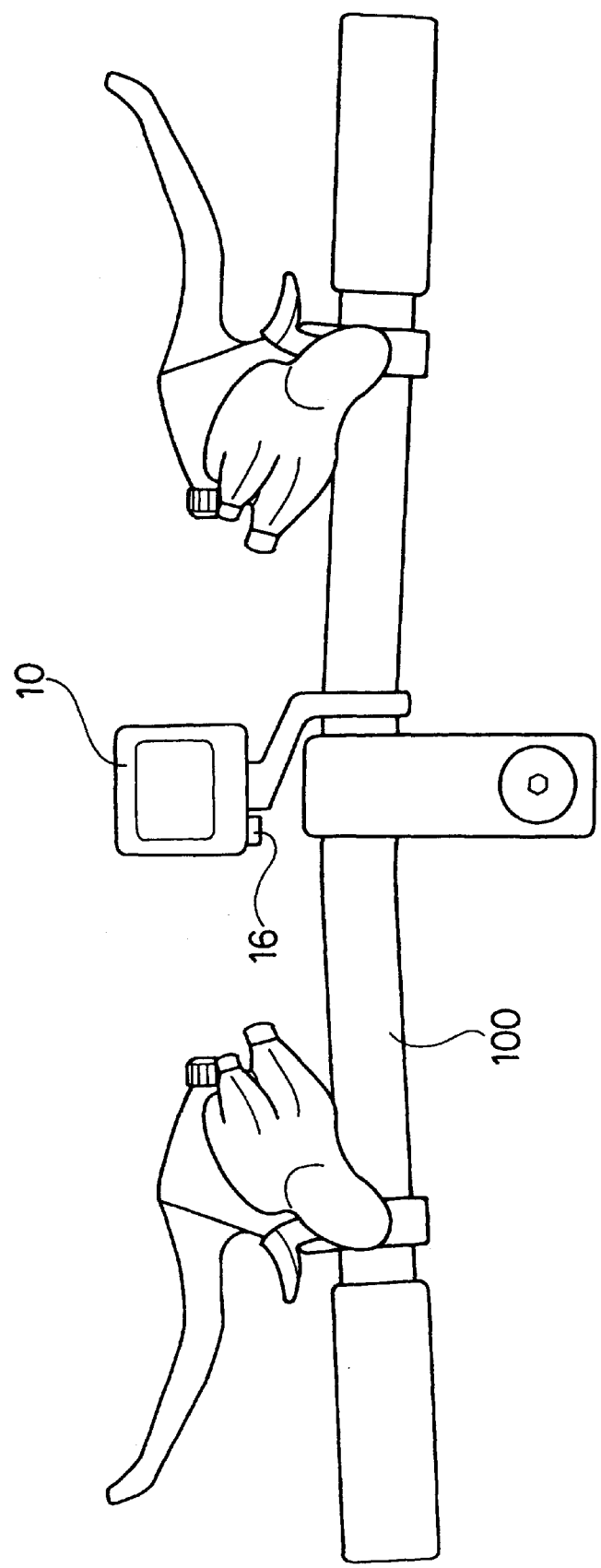
FIG. 1 is an oblique view showing a pair of cycle handlebars having a cycle computer affixed thereto.

Referring to FIGS. 1–4, a preferred embodiment of an cycle computer assembly 10 is shown. Computer 10 generally includes casing 12, switch 14, flip 16 and magnet 18.

It will be appreciated that terms such as "front", "back" and "side" used hereinbelow are merely for ease of description and refer to the orientation of the components as shown in the Figures. It should be understood that any orientation of assembly 10 and the components thereof described herein is within the scope of the present invention.

For exemplary purposes only, described hereinbelow are preferred embodiments wherein assembly 10 is provided for use with a bicycle. As shown in FIG. 1, the assembly 10 is mounted on the handlebars 100 of the bicycle. As discussed above, it will be understood, that the use of the assembly with a bicycle, or any cycle for that matter, is not a limitation on the present invention. For example, assembly 10 can be used with lap top computers, all terrain vehicles, go-karts and the like.

Casing 12 includes a front wall 20, back wall 22 and a plurality of side walls 24 that cooperate to surround a casing interior 26. The casing interior 26 houses the central processing unit (CPU) 28. Preferably, the front wall 20 of the casing 12 includes a screen 20a or the like for displaying information generated by the CPU 28. Casing 12 is preferably comprised of a plastic such as nylon or a phenolic or other synthetic resin. However, casing 12 can be comprised of any material that does not interfere with the magnetic effect exerted by the magnet 18 on the switch 14.

The switch 14 and magnet 18 are mounted in close proximity to each other. Switch 14 is mounted in the casing interior 26 and magnet 18 is attached to the flip 16. Switch 14 is a magnetically actuated switch and is located adjacent one of the side walls 24, and is preferably attached to the side wall 24 by glue or other adhesive.

Switch 14 can be any electro-magnetic switch known in the art, such as a reed-type switch. It will be appreciated by those skilled in the art that the switch elements of a reed switch change state when the reed switch is exposed to a magnetic field, as is necessary for operation of the present invention. Switch 14 can be configured to be normally closed or normally open. Preferably, switch 14 is normally in an open position. Open position is used herein to mean that when the switch is not affected by a magnet the switch is held open, such that the computer is off (i.e., the circuit is open). FIG. 4a illustrates schematically the normally open position. As shown, magnet 18 far enough from switch 14 so that the magnetic field produced by magnet 18 is not affecting switch 14. Accordingly, switch 14 is held open. In FIG. 4b, the magnet 18 is close enough to switch 14 for the magnetic field produced by the magnet 18 to close the switch 14.

Figure 2:
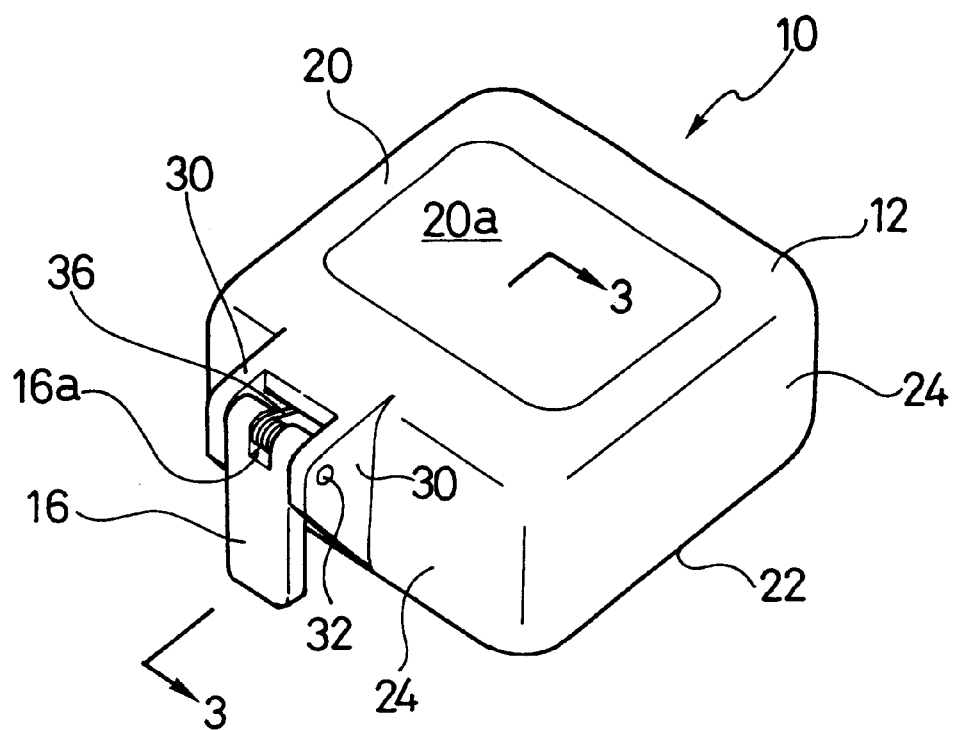
FIG. 2 is a perspective view of a cycle computer casing and switch assembly in accordance with a first embodiment of the present invention.

The casing 12 includes opposing members 30 that each have axially aligned openings 32 defined therein for receiving a hinge pin 34. Flip 16 has an opening 16 defined therein for receiving hinge pin 34. In a preferred embodiment, flip 16 has a spring recess 16a therein for receiving a spring 36 that is disposed on the hinge pin 34, as shown in FIG. 2. Spring 36 biases flip 16 in a predetermined position (referred to herein as off position). In off position, a gap 38 is defined between magnet 18 and switch 14. Gap 38 is wide enough so that magnet 18 does not activate or close the switch. It will be understood that the dimensions of gap 38 are dependent on the sensitivity of switch 14 and the strength of magnet 18. It will be appreciated by those skilled in the art that magnet 18 and switch 14 can be configured for maximum sensitivity as desired.

Because switch 14 is disposed inside the casing 12, practically no moisture can get inside to affect the switch 14, the CPU 28 or the components thereof.

Switch 14 has a pair of lead wires 40 that extend therefrom to the CPU 28. Therefore, when the switch is closed, and the circuit is subsequently closed, the CPU is energized. When the switch is opened, the CPU is shut off.

Figure 3:
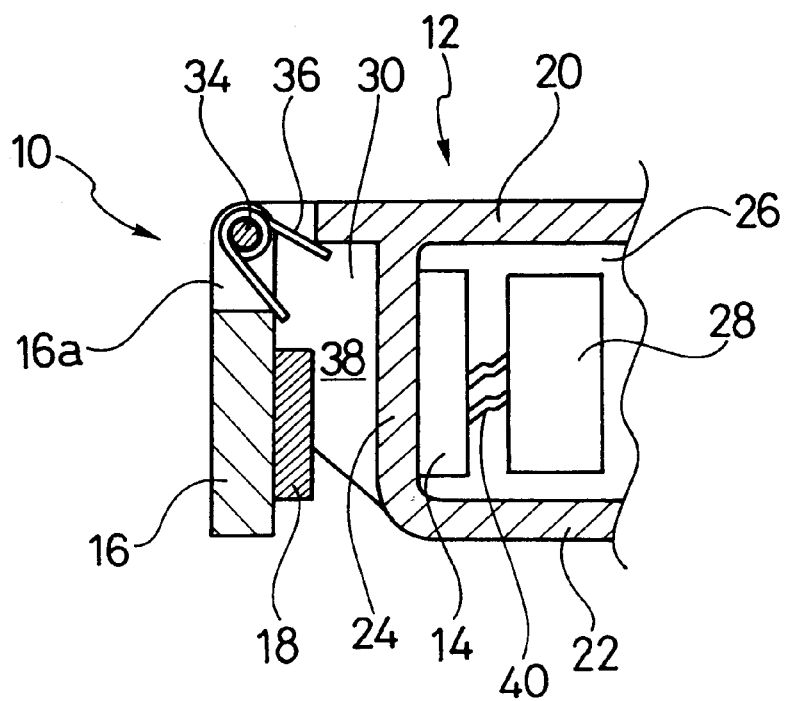
FIG. 3 is a sectional side elevation of the cycle computer casing and switch taken along line 3—3 of FIG. 2. showing the switch disposed in the casing interior and showing the flip in an open position.
Figure 4:
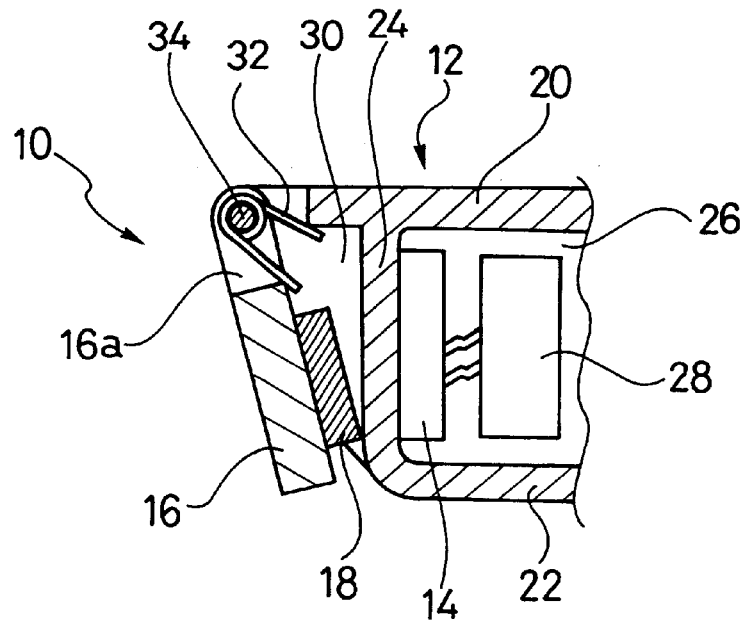
FIG. 4 is a sectional side elevation similar to FIG. 3 showing the flip in a closed position.
Figure 4A:
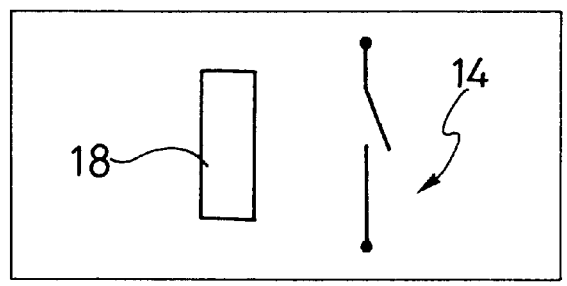
Figure 4B:
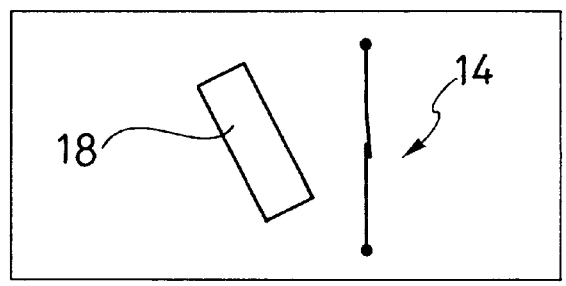

Referring to FIGS. 3–4b, in operation, as mentioned above, switch 14 is normally open. Flip 16 is normally biased by spring 36 in off position. At this point, the computer is off. When magnet 18 is in this position, the magnetic field produced by magnet 18 is not strong enough to close switch 14 as shown in FIGS. 3 and 4a. To turn the computer on, the flip 16 is pressed inwardly, such that it pivots about hinge pin 34. Flip 16 is then held in the position shown in FIG. 4 (referred to herein as on position). As can be seen in FIGS. 4 and 4b, in the on positions the magnet 18 is in closer proximity to switch 14 and the switch 14 is closed, thereby turning on the computer.

In another embodiment, the position of the flip 16 shown in FIG. 3 may be the on position where the switch is closed and the computer is on. In this embodiment, to place the flip in an off position, the flip 16 is pulled upwardly so that it is substantially parallel to the front wall 20 of the casing. It will be understood that those skilled in the art will be able to make numerous modifications to the orientation of the switch, the magnet and the flip. All such modifications are within the scope of the present invention.

It will be understood that the device is not limited to activation by a magnetic field generating device. Any field, beam or the like that can affect the state of the switch is within the scope of the present invention. For example, a light beam emitting device and appropriate receptor can be used. Sound waves, such as ultrasonic waves produced by a magnetostrictive element can be used.

Figure 5:
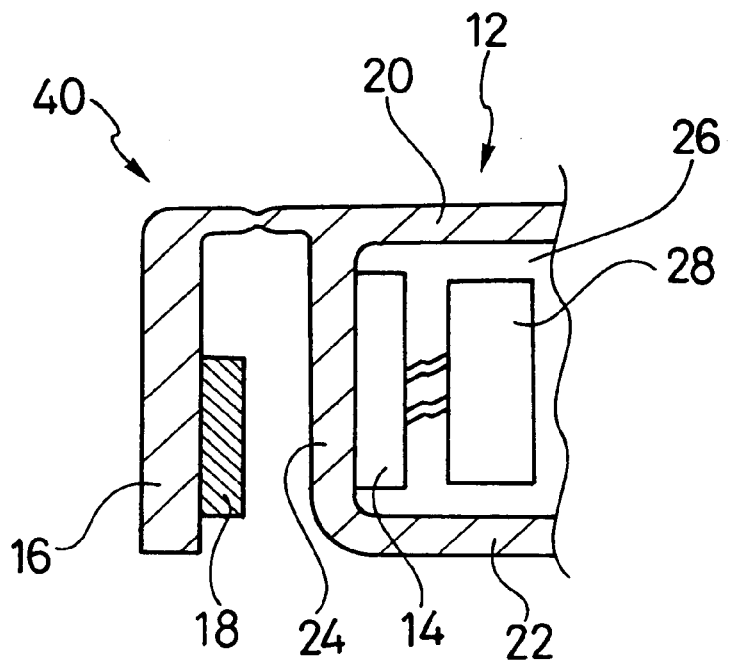
FIG. 5 is a sectional side elevation of a cycle computer casing in accordance with a second embodiment of the present invention.

FIG. 5 shows another embodiment 40 of the present invention. In this embodiment, the casing 12 and the flip 16 are molded out of a resilient material as a single unit. The flip 16 is connected to the casing 12 by a thin strip of resilient hingeable material.

Figure 6:
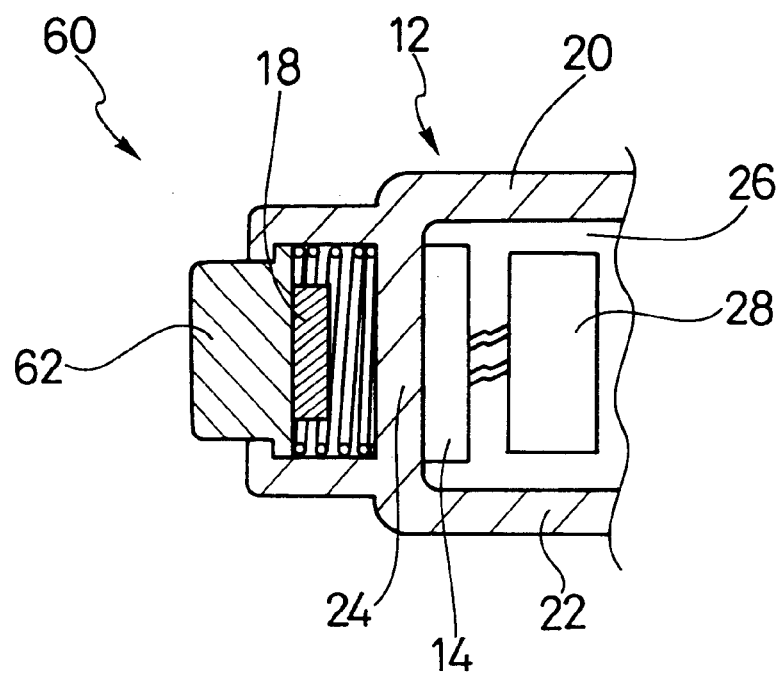
FIG. 6 is a section side elevation of a cycle computer casing in accordance with a third embodiment of the present invention.

FIG. 6 shown yet another embodiment 60 of the present invention. In this embodiment, the magnet 18 is secured to the backside of a button 62. The casing 12 includes a spring housing 64 extending from a side wall 24 thereof. The spring housing surrounds a spring 66 that biases the button 62 outwardly so that the magnet 18 is held away from switch 14 to allow switch 14 to remain in an open state. To turn the computer on, the button 62 is pressed inwardly so that the magnetic field produced by the magnet 18 causes the switch to activate the CPU.

The general concept of the invention is a switch disposed inside a casing so that it is weatherproof, wherein the switch is affected by a field, such as a magnetic field, instead of requiring direct manual activation. Preferably, the magnet is movably associated with the outside of the casing so that it can be disposed in at least two positions; one where the magnetic field produced by the magnet affects the switch, and one where it does not. Movably associated with the outside of the casing means that the magnet 18 is outside of the casing 12 and is somehow secured to the casing 12 (whether by flip, button, hinge, etc.) and is capable of moving relative to the casing 12.

The embodiments of the present invention recited herein are intended to be merely exemplary and those skilled in the art will be able to make numerous modifications to them without departing from the spirit of the present invention. All such modifications are intended to be within the scope of the present invention as defined by the claims appended hereto.

What is claimed is:

1. An assembly comprising:
    a) a casing,
    b) a screen connected to the casing, the screen configured to display information;
    c) a magnet sensitive switch disposed inside said casing, and
    d) a magnet movably associated with an outside of said casing, such that the magnet is capable of movement relative to said casing,
    a flip hingedly secured to an outside of said casing, wherein said magnet is secured to said flip,
    wherein said magnet can be disposed in at least two positions, said at least two positions including a first position where the magnetic field generated by the magnet does not affect the switch, and a second position where the magnetic field generated by the magnet does affect the switch, and
    wherein the screen is switched between an on configuration and an off configuration in response to the movement of the magnet.

2. The assembly of claim 1 wherein said casing includes a front wall, a back wall and a plurality of side walls that cooperate to surround a casing interior, wherein said switch is disposed in said casing interior.

3. The assembly of claim 2 wherein said switch is secured to a first side wall of said casing and wherein said flip is hingedly secured to said casing adjacent said first side wall, such that said flip holds said magnet in said first position.

4. The assembly of claim 1 wherein said flip is hingedly secured to said outside of said casing by a hinge pin, and wherein said hinge pin has a spring disposed thereon that biases said flip to hold said magnet in said first position.

5. The assembly of claim 4 wherein said hinge pin extends between two opposed members extending from said outside of said casing.

6. The assembly of claim 1 wherein said casing and said flip are formed as a single unit, and wherein said flip is connected to said casing by a piece of resilient material, such that said flip is normally biased to hold said magnet in said first position.

7. The assembly of claim 1 wherein said magnet is secured to a button movably coupled to an outside of said casing.

8. The assembly of claim 7 wherein said button is biased away from said switch by a spring, and wherein said spring normally biases said button such that said magnet is held in said first position.

9. An assembly comprising:
    a casing;
    a processor;
    a screen operatively connected to the processor;
    a magnet sensitive switch disposed inside said casing;
    a magnet movably associated with an outside of the casing and capable of relative movement thereto;
    wherein the magnet can be disposed in at least two positions, said at least two positions including an operative position wherein the magnetic field of the magnet affects the switch and a non-operative position wherein the magnetic field of the magnet does not affect the switch; and
    wherein when the magnet is in the operative position, the processor generates information and the information is displayed on the screen and
    wherein said assembly is connected to the handlebars of a cycle, and wherein said screen displays information associated with said cycle.

10. An assembly comprising:
    a casing substantially sealed against moisture;
    a processor in the casing;
    a screen in the casing operatively connected to the processor;
    a lead wire connecting the screen to the processor, wherein the lead wire is housed in the casing;
    a magnet sensitive switch disposed inside said casing;
    a magnet movably associated with an outside of the casing and capable of relative movement thereto;
    wherein the magnet can be disposed in at least two positions, said at least two positions including an operative position wherein the magnetic field of the magnet affects the switch and a non-operative position wherein the magnetic field of the magnet does not affect the switch; and
    wherein when the magnet is in the operative position, the processor generates information and the information is displayed on the screen.

* * * * *